United States Patent [19]

Takada et al.

[11] 4,008,641

[45] Feb. 22, 1977

[54] DEVICE FOR MODULATING A MUSICAL TONE SIGNAL TO PRODUCE A ROTATING SOUND EFFECT

[75] Inventors: Akira Takada; Tadao Sakai, both of Osaki, Japan

[73] Assignee: Roland Corporation, Osaka, Japan

[22] Filed: Nov. 20, 1975

[21] Appl. No.: 633,909

[30] Foreign Application Priority Data

Dec. 7, 1974 Japan ........................... 49-141046

[52] U.S. Cl. ............................. 84/1.24; 84/DIG. 1; 179/1 J

[51] Int. Cl.² ..................... G10H 1/02; H04M 1/00

[58] Field of Search ............. 84/1.24, 1.25, DIG. 1; 179/1 M, 1 J

[56] References Cited

UNITED STATES PATENTS

| | | | |
|---|---|---|---|
| 3,229,019 | 1/1966 | Peterson | 84/DIG. 1 |
| 3,255,297 | 6/1966 | Long | 84/DIG. 1 |
| 3,886,835 | 6/1975 | Peterson | 84/1.25 |

*Primary Examiner*—E. S. Jackmon

[57] ABSTRACT

A device for modulating a musical tone signal to produce a rotating sound effect. A first channel is coupled to an input for a musical tone and has an amplitude modulator therein. At least two further channels each having an amplitude modular therein are coupled to the input through a delay circuit. A frequency modulator is coupled to the amplitude modulator in the first channel and to the delay circuit means for frequency modulating the musical tone signals therein and phase shifters are coupled between the frequency modulator and the respective amplitude modulators in the further channels for shifting the phase of the musical tone signal in the channels. The outputs of the amplitude modulators are coupled acoustically or electrically for converting the modulated musical tone signals into sound, with the musical tone signal from said first channel being in the center of the reproduced sound and the musical tone signals from the further channels being on opposite sides of the musical tone signal from the first channel. The frequency modulator, amplitude modulators and phase shifters modulate the signals in the further channels so that when the volume level in one channel is a maximum the volume level in the other channel is a mimimum and vice versa and when the volume level in one channel is a maximum the modulated frequency is substantially a maximum and when the volume level in the other channel is a maximum the modulated frequency is substantially a minimum, and when the volume levels of the signals in the other channels are about equal the volume level and frequency of the signal in the first channel is successively a maximum and a minimum, whereby a rotating sound effect is produced.

5 Claims, 6 Drawing Figures

DEVICE FOR MODULATING A MUSICAL TONE SIGNAL TO PRODUCE A ROTATING SOUND EFFECT

This invention relates to an electronic device for modulating a musical tone signal and more particularly to such a device in which the musical tone signal is modulated to produce a rotating sound effect.

BACKGROUND OF THE INVENTION

There has heretofore been known an electronic musical instrument having means to produce a modulation effect. A complex modulation effect has been produced by means of a delay circuit, an example of such a device being shown in FIG. 1. In the device shown in FIG. 1, the musical tone signal input from the input terminal 1 is divided and supplied to two circuit systems $D_1$ and $D_2$. The component supplied to system $D_1$ is amplified in an amplifier 4 and supplied to a speaker 6. The component supplied to system $D_2$ is passed through a delay circuit 3, which is controlled by a modulator, amplified in an amplifier 5 and supplied to a speaker 7. The musical tone which is supplied the system $D_2$, is, after having passed through the delay circuit 3, modulated by a delay time by means of the modulator 2, and is further influenced by the phase difference effect which may be produced between the musical tone signal which has been modulated in a complicated manner in the system $D_2$ and the musical tone signal, which has passed straight through the system $D_1$, so that there will be produced a rather complicated modulation effect by the above-described circuit. Thus, there has heretofore been attained a complicated modulation effect in a musical tone signal.

OBJECT OF THE INVENTION

It is the object of this invention to provide a device for creating a modulation effect by which can be produced an adequate rotating sound effect, which device utilizes a simple circuit including a phase shifter and an amplitude modulator.

BRIEF DESCRIPTION OF THE DRAWINGS

The invention will now be described in greater detail in connection with the accompanying drawings in which.

DETAILED DESCRIPTION OF THE INVENTION

Figure 1:
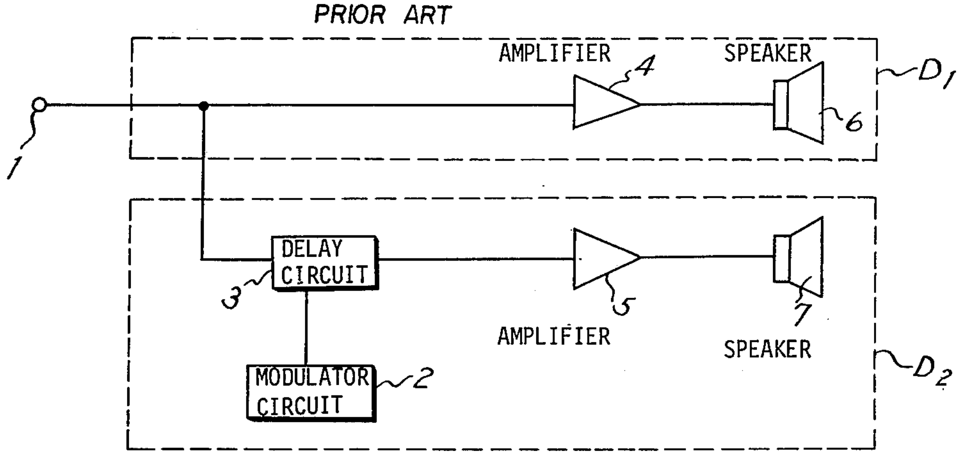
Fig. 1 PRIOR ART
FIG. 1 is a schematic diagram of a basic circuit system for a conventional device for producing a modulation effect.
Figure 2:
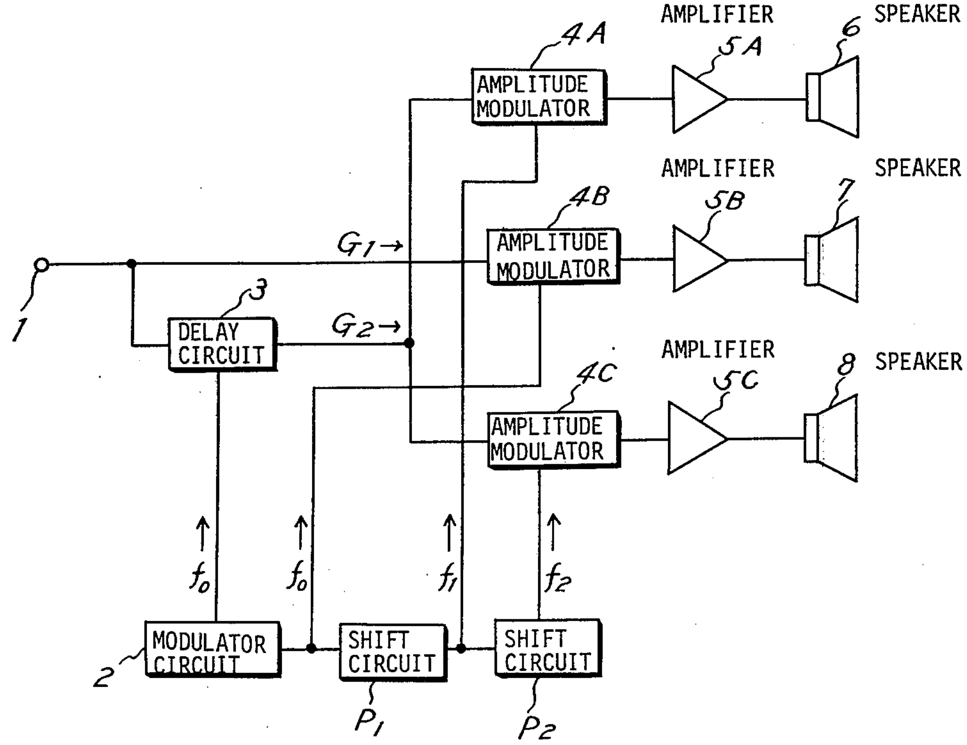
FIG. 2 is a schematic circuit diagram of a system for producing a modulation effect according to this invention.

As seen in FIG. 2, the circuit system according to this invention receives a musical tone signal at the input terminal 1 and divides into two musical tone signals $G_1$ and $G_2$, the former tone signal $G_1$ being supplied directly into an amplitude modulator 4B, and the latter tone signal $G_2$ being supplied through a delay circuit 3 to the remaining two amplitude modulators 4A and 4C connected to the delay circuit. The musical tone signal $G_2$ is modulated by a delay time by a modulation wave $f_o$, shown in FIG. 3(1), from a modulation signal generator 2 connected to the delay circuit 3, and the time phase of the musical signal $G_2$ will be caused to advance or to slow down in accordance with the increase or decrease of the varying voltage of the modulation wave $f_o$, and consequently there will be a frequency variation in accordance with the variation of the voltage of the modulation wave $f_0$ per unit time, so that the musical tone signal $G_2$ will become a frequency modulated signal as shown in FIG. 3 (2).

Figure 3:
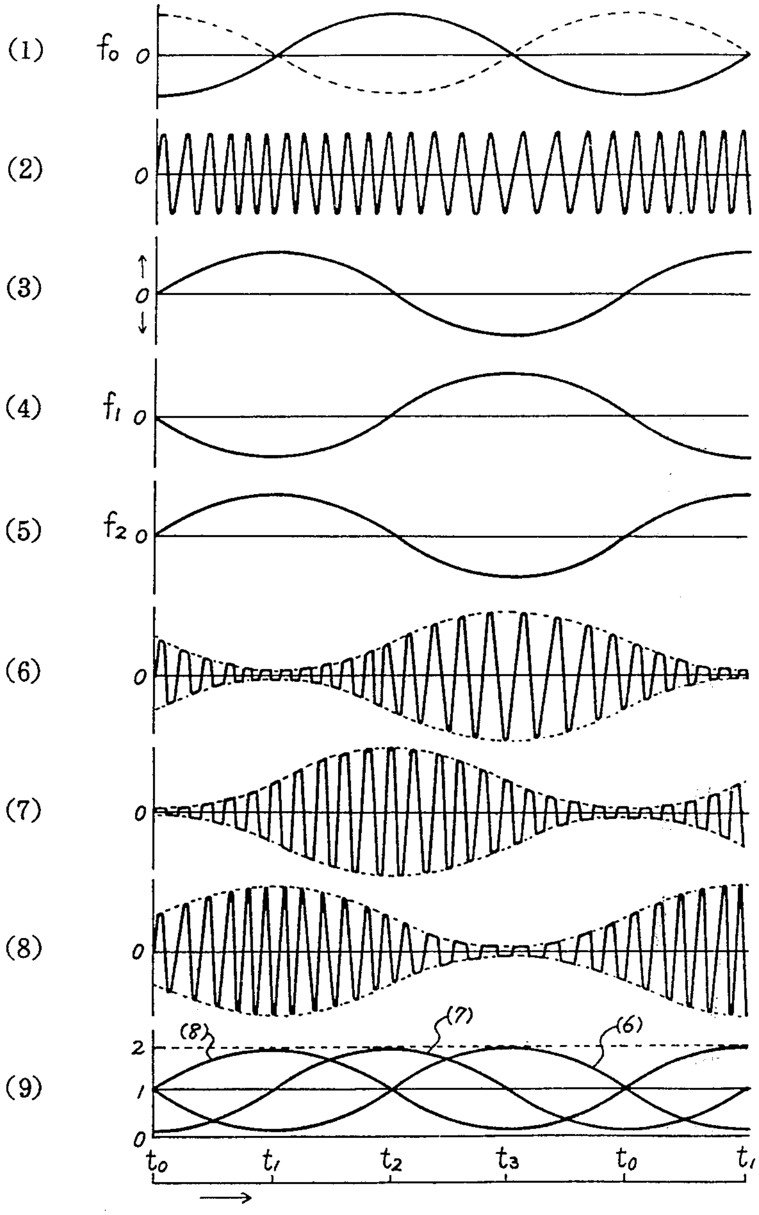
FIGS. 3(1) to 3(9) are wave forms for the signals at respective points of the system for producing a modulation effect according to this invention, which wave forms are useful for an explanation of the operation of the system with respect to the time phase.

FIG. 3 (3) is a graph to show the frequency variation of the musical tone signal $G_2$.

On the other hand, the modulation signal (about 0.2 – 10 Hz) from the modulation signal generator 2 is supplied to the amplitude modulator 4B or as modulation wave $f_0$, and is also supplied to a phase shifter $P_1$ wherein its phase is shifted to produce a modulation wave $f_1$, shown in FIG. 3(4). This is in turn supplied to the amplitude modulator 4A, and also to a phase shifter $P_2$, wherein it is again phase shifted to produce a modulation wave $f_2$, shown in FIG. 3 (5), which is then supplied to the amplitude modulator 4C. The modulation wave $f_0$ is phase retarded by 90° by the phase shifter $P_1$ to produce modulation wave $f_1$, and said modulation wave $f_1$ is phase retarded by 180° by the phase shifter $P_2$ to produce modulation wave $f_2$. Consequently, the modulation wave $f_2$ is caused to lead wave $f_0$ by 90°.

Meanwhile, the musical tone signals $G_1$ and $G_2$ are amplitude modulated by the amplitude modulators 4A, 4B and 4C so as to have wave forms as shown in FIGS. 3 (6), 3 (7) and 3 (8), respectively. The wave form in FIG. 3 (6) is that of musical tone signal $G_2$ which has been amplitude modulated by the amplitude modulator 4A, the wave form 3 (7) is that of musical tone signal $G_1$ which has been amplitude modulated by the amplitude modulator 4B and wave form 3 (8) is that of musical tone signal $G_2$ which has been amplitude modulated by the amplitude modulator 4C. The phase difference between the peaks of the envelopes of the respective modulated wave forms 3 (6), 3 (7) and 3 (8) is 90° the same as between the peaks of the modulation waves $f_0$, $f_1$ and $f_2$. The musical tone signals $G_1$ and $G_2$ having been amplitude modulated by the amplitude modulators 4A, 4B and 4C are fed through the amplifiers 5A, 5B and 5C to the speakers 6, 7 and 8, respectively, which will produce sounds accordingly. These acoustically mixed musical tone signals will have complicated modulation effects, and they will at the same time have a rotation sound effect due to the said 90° phase difference between the peaks of the envelopes of the respectively amplitude modulated waves. This effect will be described in detail in connection with FIG. 4.

Figure 4:
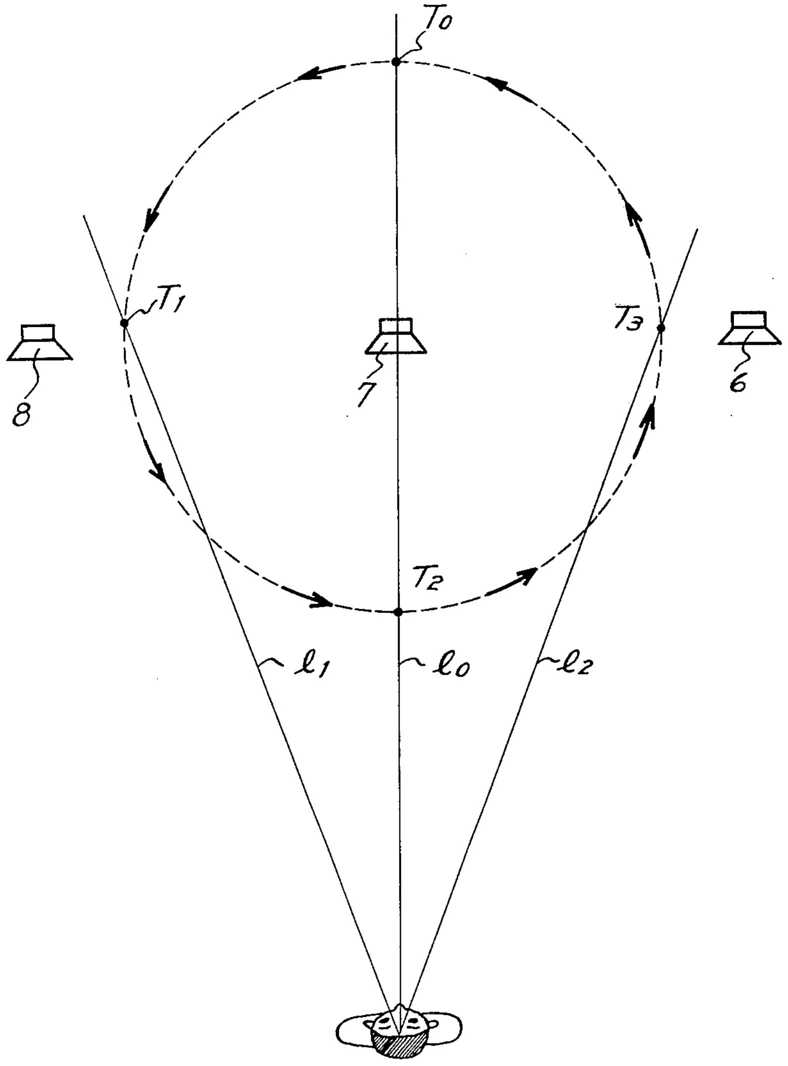
FIG. 4 is a diagramatical representation of the tone effect produced by the system according to this invention.

If the circuit as shown in FIG. 2 is operated with the speakers 6, 7, and 8 arranged as shown in FIG. 4, wherein the speakers are positioned on a straight line and spaced equal distances right to left as viewed from the listener, then the composite sound of the musical tones issued from the speakers 6, 7 and 8 will be sensed by the listener to be a rotating sound, i.e. as if the origin of sound were moving along a circle. As can be seen from the envelopes of waves of FIGS. 3 (6), 3 (7) and 3 (8) the musical tone signals issuing from the speakers 6 and 8 at the time $t_0$ on the time axis of the graph are balanced because both are at an equal level, as shown in FIG. 3 (9), but that from the speaker 7 is substantially zero, so that the listener will hear the musical tone as if it originated at a point $T_0$ on a straight line $l_0$ directly in front of him. During the time which elapses from $t_0$ to $t_1$, the tone volumes from speakers 6 and 8 will become unbalanced, in the tone volume from the speaker 8 being gradually increased to level 2 at the time $t_1$, while the tone volume from the speaker 6 will gradually decrease until it is neglegible, so that the resultant tone volume of level 2 from the speaker 8 and the volume of level 1 from the speaker will be sensed as if it originated at a point $T_1$ on the straight line $l_1$. During a further interval of time from $t_1$ and $t_2$, the levels of the tone volumes from speakers 6 and 8 will again approach a balance, and both will be at a level 1 at the time $t_2$, while the level of the tone volume of the speaker 7 at that time $t_2$ will be 2. Because this is a much higher level than the level at time $t_0$, the musical tone signal will sound as if it originated at point $T_2$ on the straight line $l_0$, which point $T_2$ is much nearer to the listener than the point $T_0$.

Within the interval of time from $t_0$ to $t_1$, the frequency of the musical tone signal from the speaker 8 is shifted towards a higher frequency, and reaches its maximum frequency at the maximum level, so that the listener will hear the tone as if the origin thereof were approaching him. Thus, the tone origin will seem to the listener as if it were moving along a circular arc from point $T_0$ to $T_2$.

During the interval from time $t_2$ to time $t_3$, the relation between the levels of the tone volumes from the speakers 6 and 8 will change in the opposite way from that described above, the level of the tone volume of the speaker 6 gradually increasing to a level 2 at time $t_2$, and that of the speaker 8 becoming negligible, so that the musical tone signal will sound as if it were coming from a point $T_3$ on the straight line $l_2$ due to the relative strength of the volume level 1 of the speaker 7 and the volume level 2 of the speaker 6. In the time interval from $T_3$ to $t_0$, the tone volume level from speaker 6 will again approach a balance with the tone volume level from the speaker 8, and at the time $t_0$, both the tone volumes are at an equal level 1 so as to be balanced, the listener will hear a musical tone from the point $T_0$ on the straight line $l_0$, because the tone volume level from the speaker 7 has become substantially zero. Within the period between the time $t_2$ and $t_0$, the frequency of the musical tone signal from the speaker 6 is shifted towards a lower frequency and reaches its minimum frequency at the maximum level, so that the tone origin will seem to the listener to be moving along a circular arc from point $T_2$ to point $T_0$. The frequency of the signal from speaker 7, i.e. waveform 3 (7) is constant. Thus, the origin of the musical tone signal will sound as if it were moving along a circle in the direction $T_0 \rightarrow T_1 \rightarrow T_2 \rightarrow T_3 \rightarrow T_0$.

Figure 5:
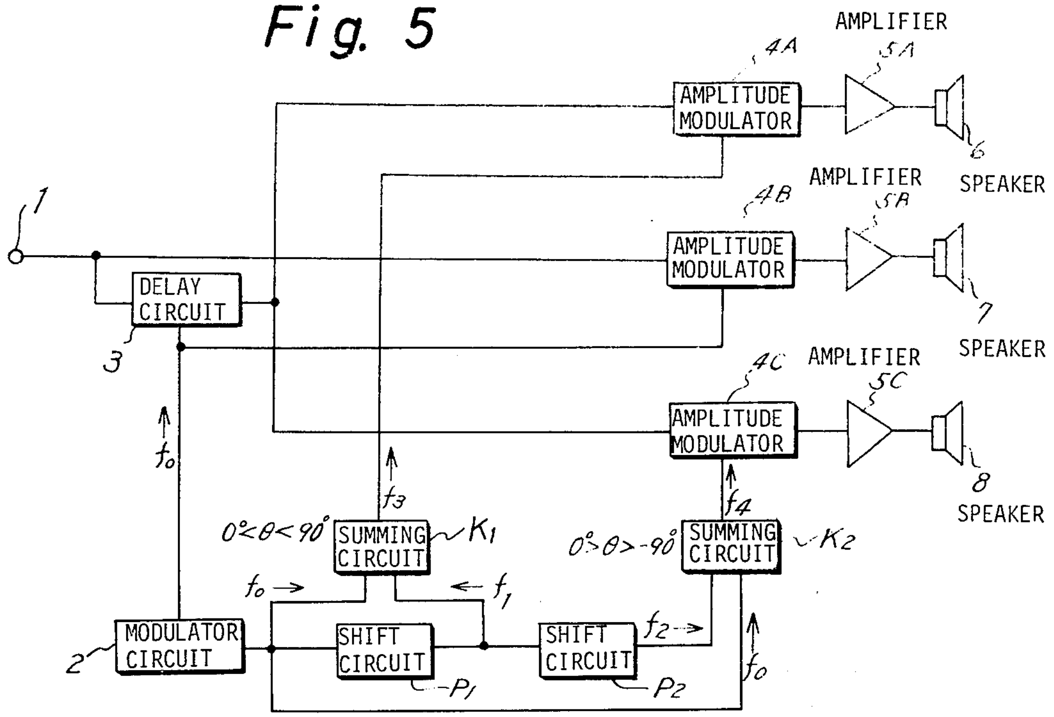
FIGS. 5 and 6 are schematic circuit diagrams of modified forms of the system according to this invention.

In contrast to the system of FIG. 2, wherein the phase difference between the respective modulated waves $f_0$, $f_1$ and $f_2$ is 90°, the phase difference may be an optional difference between 0° and 90°, as in the system of FIG. 5, whereby a substantially similar effect may be attained. In FIG. 4, $K_1$ and $K_2$ are summing circuits coupled between the phase shift circuits $P_1$ and $P_2$ and amplitude modulators 4A and 4C, and wherein there are produced modulated waves $f_3$ and $f_4$, the phase difference of which relative to the modulated wave $f_0$ is within the range of ± 90°.

Figure 6:
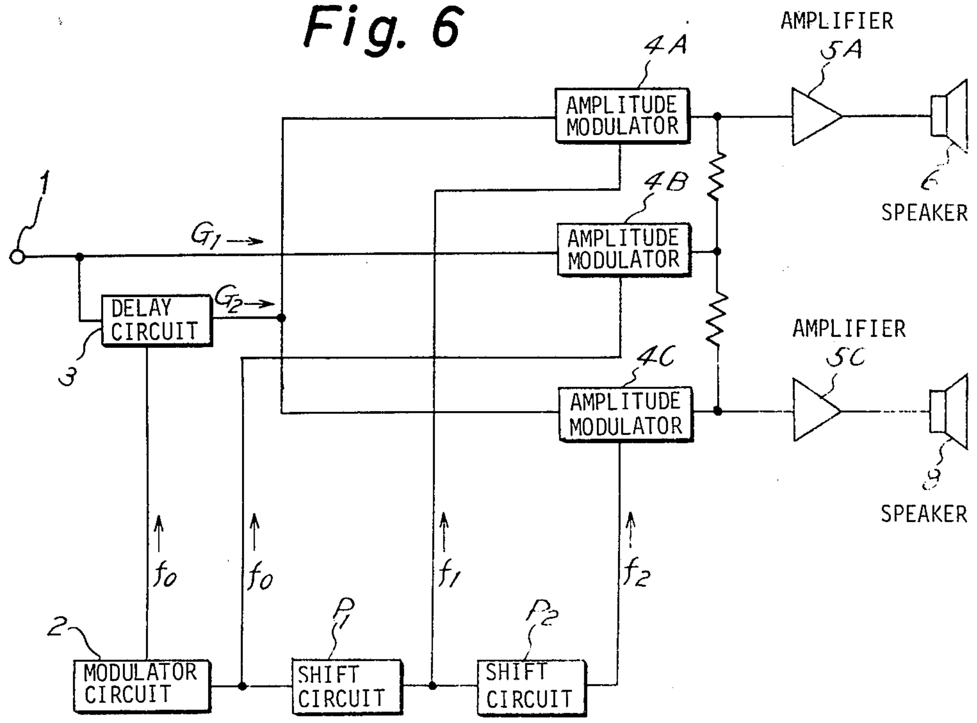

In FIG. 6 only two speakers 6 and 8 are used, in contrast to FIG. 2 and FIG. 5, wherein three speakers 6, 7 and 8 are utilized for acoustically mixing the modulated musical tone signals. That is to say, in FIG. 6, the output signal from the amplitude modulator 4B is supplied to both the amplifiers 5A and 5C, these amplifiers constituting an electrical mixing system from which a substantially similar effect may be attained as described above.

For the delay circuit used in FIG. 2, FIG. 4 and FIG. 6, there can be used other systems such as an electronic delay system, a phase shifter circuit having a resistor and a capacitor coupled together, or a delay circuit wherein inductances and capacitances are coupled in multistages. Depending on the type of delay circuit which has been used, the modulated signal $F_0$ of FIG. 3 (1) may have a phase opposite to that described above. In such a case, $f_1$ would lead $f_0$ by 90° and $f_2$ would lag $f_0$ by 90°.

The device for producing the modulation effect according to this invention, with which there is produced a very good rotating musical tone effect, has a simple circuit system and is therefore much more useful for an electronic musical instrument than any conventional system of producing such a modulated effect.

What is claimed is:

1. A device for modulating a musical tone signal to produce a rotating sound effect comprising an input of a musical tone signal, a first channel coupled to said input and having an amplitude modulator therein, at least two further channels each having an amplitude modulator therein, a delay circuit means coupled between said input and said further channels, a frequency modulation means coupled to said amplitude modulator in said first channel and to said delay circuit means for frequency modulating the musical tone therein, phase shift means coupled between said frequency modulation means and the respective amplitude modulators in said further channels for shifting the phase of the musical tone signals in said channels, and coupling means coupling the outputs of said amplitude modulators and including transducer means for converting the modulated musical tone signals into sound, with the musical tone signal from said first channel being in the center of the reproduced sound and the musical tone signals from the further channels being on opposite sides of the musical tone signal from the first channel, said modulating means, amplitude modulators and phase shift means modulating the signals in the further channels so that when the volume level in one further channel is a maximum the modulated frequency is substantially a maximum, and when the volume level in the other further channel is a maximum, the modulated frequency is substantially a minimum, and when the volume levels of the signals in the further channels are about equal, the volume level and frequency of the signal in the first channel is successively a maximum and a minimum, whereby a rotating sound effect is produced.

2. A device as claimed in claim 1 in which said phase shift means comprises phase shifters connected to the respective amplitude modulators for shifting the signals in the further channels 90° out of phase with the signal in said first channel.

3. A device as claimed in claim 1 in which said phase shift means comprises phase shifters and summing circuits to which the phase shifters are coupled, the summing circuits being connected to the respective amplitude modulators for shifting the signals in the further channels out of phase with the signal in said first channel an amount of up to 90°.

4. A device as claimed in claim 1 in which said coupling means comprises an acoustic transducer for each channel, whereby said channels are coupled acoustically.

5. A device as claimed in claim 1 in which said coupling means comprises an acoustic transducer for each of said further channels and the output of said channel being electrically coupled to the electrical outputs of said further channels so as to be equally divided among them.

* * * * *